United States Patent
Rijpers et al.

(10) Patent No.: US 6,901,044 B2
(45) Date of Patent: May 31, 2005

(54) OPTICAL INFORMATION MEDIUM AND ITS USE

(75) Inventors: Johannes Cornelis Norbertus Rijpers, Eindhoven (NL); Guo-Fu Zhou, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 23 days.

(21) Appl. No.: 10/011,885

(22) Filed: Dec. 4, 2001

(65) Prior Publication Data

US 2002/0110081 A1 Aug. 15, 2002

(30) Foreign Application Priority Data

Dec. 15, 2000 (EP) .............................. 00204602

(51) Int. Cl.[7] .............................. G11B 5/84; G11B 7/26
(52) U.S. Cl. .................................................... 369/284
(58) Field of Search ................................ 369/284, 283, 369/285, 275.2, 288

(56) References Cited

U.S. PATENT DOCUMENTS

| | | | | |
|---|---|---|---|---|
| 4,357,616 A | * | 11/1982 | Terao et al. | 369/275.1 |
| 5,272,326 A | * | 12/1993 | Fujita et al. | 369/275.5 |
| 5,652,036 A | | 7/1997 | Kobayashi | 428/64.1 |
| 6,040,066 A | * | 3/2000 | Zhou et al. | 428/641 |
| 6,064,642 A | * | 5/2000 | Okubo | 369/275.1 |
| 6,127,049 A | * | 10/2000 | Zhou et al. | 428/641 |
| 6,159,573 A | * | 12/2000 | Zhou | 369/283 |
| 6,192,024 B1 | * | 2/2001 | Inoue et al. | 369/275.1 |
| 6,312,780 B1 | * | 11/2001 | Kasami et al. | 369/283 |
| 6,333,913 B1 | * | 12/2001 | Yoshinari et al. | 369/100 |

* cited by examiner

Primary Examiner—George Letscher
Assistant Examiner—Christopher R. Magee
(74) Attorney, Agent, or Firm—Michael E. Belk

(57) ABSTRACT

An optical information medium (20) for erasable recording by means of a laser-light beam (10) is provided. A substrate (1) holds a stack (2) of layers with a phase-change recording layer (5) between a first dielectric layer (4) and a second dielectric layer (6). A light-absorptive layer (7) is present proximate the recording layer (5) and is made of a compound of the formula $QR_x$, in which Q is the element Si, Ge, Ti, Zr, Hf, Nb or Ta, R is the element O or N, and $0 < x \leq 2.5$, in order to achieve that $0.8 < A_c/A_a < 1.50$, in which $A_c$ and $A_a$ are the respective quantities of laser-light absorbed in the recording layer (5) in the crystalline state and the amorphous state at a laser-light wavelength selected from a range of 350–450 nm. Thus high data rates and low data jitters are achieved at this short wavelength range by tuning x to an optimal value during manufacture of the optical information medium.

25 Claims, 1 Drawing Sheet

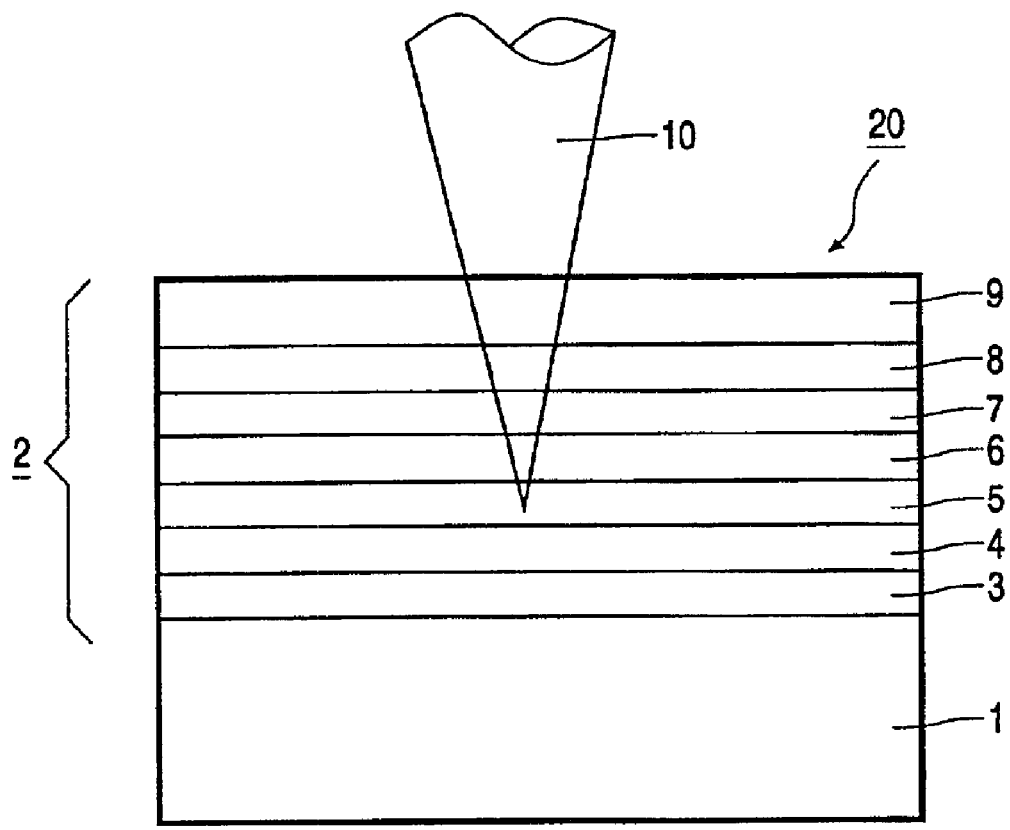

OPTICAL INFORMATION MEDIUM AND ITS USE

TECHNICAL FIELD

The invention relates to an optical information medium for erasable recording and high-speed recording by means of a laser-light beam having a laser-light wavelength.

BACKGROUND AND SUMMARY OF THE INVENTION

An optical information medium of the type described in the opening paragraph is known from U.S. Pat. No. 5,652,036. The known medium has a substrate carrying a stack of layers comprising the layers described in the opening paragraph and additional layers.

An optical data storage medium based on the phase change principle is attractive, because it combines the possibilities of direct overwrite (DOW) and high storage density with easy compatibility with read-only optical data storage systems. Phase-change optical recording involves the formation of submicrometer-sized amorphous recording marks in a crystalline recording layer using a focused relatively high power laser-light beam. During recording of information, the medium is moved with respect to the focused laser-light beam that is modulated in accordance with the information to be recorded. Recording marks are formed when the high power laser-light beam melts the crystalline recording layer. When the laser-light beam is switched off and/or subsequently moved relatively to the recording layer, quenching of the molten marks takes place in the recording layer, leaving an amorphous information mark in the exposed areas of the recording layer that remains crystalline in the unexposed areas. Erasure of written amorphous marks is realized by recrystallization through heating with the same laser at a lower power level, without melting the recording layer. The amorphous marks represent the data bits, which can be read, e.g. via the substrate, by a relatively low-power focused laser-light beam. Reflection differences of the amorphous marks with respect to the crystalline recording layer bring about a modulated laser-light beam which is subsequently converted by a detector into a modulated photocurrent in accordance with the recorded information.

One of the most important demands in phase-change optical recording is a high data rate, which means that data can be written and rewritten in the medium with a rate of at least 30 Mbits/s. Such a high data rate requires the recording layer to have a high crystallization speed, i.e. a short crystallization time. To ensure that previously recorded amorphous marks can be recrystallized during direct overwrite, the recording layer must have a proper crystallization speed to match the velocity of the medium relative to the laser-light beam. If the crystallization speed is not high enough the amorphous marks from the previous recording, representing old data, cannot be completely erased, meaning recrystallized, during DOW. This causes a high noise level. A high crystallization speed is particularly required in high-density recording and high data rate optical recording media, such as in disc-shaped DVD+RW, DVR-red and blue which are abbreviations of a new generation high density Digital Versatile Disc+RW, where RW refers to the rewritability of such discs, and Digital Video Recording optical storage discs, where red and blue refer to the used laser wavelength. For these discs the complete erasure time (CET) has to be at most 60 ns. CET is defined as the minimum duration of an erasing pulse for complete crystallization of a written amorphous mark in a crystalline environment, which is measured statically. For DVD+RW, which has a 4.7 GB recording density per 120 mnm disk, a data bit rate of 33 Mbits/s is needed, and for DVR-red said rate is 35 Mbits/s. For rewritable phase change optical recording systems such as DVR-blue, a user data rate higher than 50 Mbits/s is required.

An additional important item in phase-change optical recording media is to obtain a high storage capacity so that such media are suitable for high density recording, e.g. a storage capacity of over 3 Gbyte at a disc diameter of 120 mm. The storage density of a phase-change optical information medium is determined by both the radial density and the tangential density of the marks. The track pitch determines the radial density, i.e. the distance between adjacent track centerlines. The track pitch is limited by thermal crosstalk. This means that the quality of the data recorded in a track is influenced by the adjacent tracks. The shape of the recorded marks may then be distorted, which results in a large jitter. The tangential density is determined by the channel bit length, which is limited by the fact that the light absorption of the amorphous state is higher than that of the crystalline state when a standard IPIM stack is used. In this stack, I represents a dielectric layer, P represents a phase-change recording layer, and M represents a reflective or mirror layer. Thereby, an amorphous portion is heated to a higher temperature than a crystalline portion when the recording layer is irradiated with laser-light. As a result, the marks written in a crystalline area are smaller than those overwritten in an amorphous area. Such a phenomenon causes an increase of jitter, which is proportional to the inverse of the channel bit length. To overcome the problem, the quantity of laser-light absorbed in an exclusively crystalline area of the recording layer should preferably be substantially equal to or larger than the quantity of laser-light absorbed in an exclusively amorphous area of the recording layer. These absorbed quantities are abbreviated as $A_c$ and $A_a$ respectively.

From said U.S. Pat. No. 5,652,036 many permutations of possible stacks are known, e.g. an IAIPIM stack, in which I, P, and M have the above mentioned meaning, and A represents the light-absorptive layer. The light-absorptive layer consists of a mixture of a dielectric material and a metal or a semiconductor material. The result of the addition of the light-absorptive layer A is that the difference between $A_c$ and $A_a$ is smaller, thus reducing the mark distortion.

A disadvantage of the known recording medium is that it is only suitable for recording at a relatively long laser-light wavelength of about 680 nm. For high density recording preferably a smaller wavelength is used, e.g. smaller than 450 nm, because the diameter of the laser recording spot is directly proportional to the used laser-light wavelength. A smaller laser recording spot results in smaller amorphous marks and therefore in a higher possible recording density. At a wavelength of 400 nm said known light-absorptive layer, comprising a dielectric material and a metal or semiconductor material, generally has a much higher absorption than at a wavelength of 680 nm, due to the optical dispersion characteristics of the metal or the semiconductor material. This causes the margin of designing and manufacturing the optical recording medium to be undesirably small. The absorption of short wavelength laser-light in the absorptive-layer is very sensitive to slight variations in composition and thickness of that layer. Furthermore its thickness would have to be very small because of its high absorption, which from a viewpoint of manufacturability is undesirable.

It is an object of the invention to provide an optical information medium for erasable recording of the type described in the opening paragraph, which is suitable for high data rate and high density recording at a laser-light wavelength in the range of 350–450 nm, and which is easy to manufacture.

This object is achieved in that the light-absorptive layer comprises a compound of the formula $QR_x$, in which Q is an element selected from the group consisting of Si, Ge, Ti, Zr, Hf, Nb and Ta, R is an element selected from the group consisting of O and N, and $0<x\leq2.5$, in order to achieve that $0.8<A_c/A_a<1.50$, in which $A_c$ and $A_a$ are the respective quantities of laser-light absorbed in the recording layer in the crystalline state and the amorphous state at a laser-light wavelength selected from a range of 350–450 nm.

The term high data rate recording, which was mentioned above, is to be understood to mean in this context a linear velocity of the medium relative to the laser-light beam of at least 7.2 m/s, which is six times the speed according to the Compact Disc standard. The important parameter is the CET, which is defined above. The CET is inversely proportional to the crystallization rate, which in its turn determines the maximum data rate. Preferably, the CET-value should be below 45 ns, necessary for a linear velocity of 9.6 m/s corresponding to eight times the CD-velocity, or even below 35 ns, necessary for a linear velocity of 14.4 m/s corresponding to twelve times the CD-velocity. The jitter of the medium should be at a low, constant level. The use of an optical recording medium according to the invention is therefore advantageous because the crystallization rate is fast enough to permit at least this recording velocity without increasing the jitter due to variation in amorphous mark diameter.

The presence of the light-absorptive layer of the compound $QR_x$ ensures that $A_c$ is substantially equal to or higher than $A_a$ at a wavelength selected from the range of 350–450 nm. This can be tuned precisely by varying x. For example $k_{\lambda=400\ nm}$, which is the imaginary part of the complex refractive index $\bar{n}$ of the compound $SiO_x$ at a wavelength of 400 nm, is a substantially smooth function of the variable x. When x=0 then $k_{\lambda=400\ nm}=2.66$ and when x=1 then $k_{\lambda=400\ nm}=0.17$. The variable k is a direct measure for the absorption of laser-light in the compound. Therefore the compound is very well usable as a tunable light-absorptive layer. A suitable absorption of the light-absorptive layer, in order to fulfil the condition $0.8<A_c/A_a<1.50$, is easily achieved by varying e.g. the fraction of O in Si. Especially the predictable and continuous dependency of $k_{\lambda=400\ nm}$ on x is advantageous from a viewpoint of manufacturability. As a result, an optimal light-absorptive layer can be chosen and the marks being written in a crystalline area have substantially the same size as those being overwritten in an amorphous area. This effect reduces jitter, and the storage density of such a recording medium is considerably enhanced. The dependency of k as a function of x when the wavelength is not 400 nm but still in the range of 350–450 nm, is similar. Even when $A_c$ and $A_a$ are substantially equal the optical contrast C for read out of the optical information medium must remain high. The optical contrast C is defined as $100(Rc-Ra)/Rc$, in which Rc and Ra are the reflectivities of the medium in crystalline and amorphous states respectively. A high optical contrast is achieved by the optical design of the stack.

A higher data rate can be obtained when $A_c>A_a$. In this case the crystalline portion of the recording layer may be heated to a higher temperature than the amorphous marks when the recording layer is irradiated with laser light having a given pulse duration, or dwell time. For erasing an amorphous mark, the temperature must be maintained above the crystallization temperature $T_x$ for a time, which is at least the CET value. Because the crystalline background obtains a higher temperature than an amorphous mark to be erased, heat will diffuse to the mark, as a result of which the mark cools down at a lower rate and will remain above $T_x$ for a longer time. Because of the slow cooling rate, the amorphous marks can stay at a temperature above $T_x$ for a time equal to or longer than CET, using the same dwell time. With a medium structure having a light-absorptive layer according to the invention, a higher data rate is achieved, without lowering the CET. In contrast to this, a stack in which $A_c$ is substantially lower than $A_a$ would result in a fast cooling structure, i.e. the crystalline background would have a lower temperature than an amorphous mark. Heat then diffuses from the mark to the crystalline background. With the same dwell time and power, the time during which the mark is above $T_x$ would be shorter than the CET, in which case the amorphous mark is not erased completely.

In an embodiment Q is Si or Ge and R is O. Si is preferred because it is very easily obtained due to its frequent use in the semiconductor industry.

A third dielectric layer may be present proximate the light-absorptive layer at a side remote from the recording layer. The third dielectric layer prevents migration between the light-absorptive layer and a material present at the side of the third dielectric layer opposite to the side of the light-absorptive layer, if any. Furthermore it tunes the cooling rate of the stack, and thus the writing sensitivity. Additionally the third dielectric layer acts as a protective barrier against environmental influences, especially when the third dielectric layer is present at a side remote from the substrate. The laser-light beam may enter the stack through the first dielectric layer or the third dielectric layer.

The thickness of the third dielectric layer is preferably between 2 and 200 nm, more particularly between 10 and 100 nm, in order to have a proper balance between protective power and manufacturability. When the thickness is smaller than 2 nm its thermal insulation may become to low. For example, a metal reflective layer or the substrate may be present adjacent the third dielectric layer. As a result, the cooling rate of the stack is increased, and, consequently, the write power. With a thickness above 200 nm, the cooling rate of the stack may become too low.

The recording layer comprises a compound of Ge and Te, e.g. GeTe. This phase-change material has the advantage of having a relatively high optical contrast C.

Other known materials suitable as a recording layer are e.g. alloys of Ge—Sb—Te, In—Se, In—Se—Sb, In—Sb—Te, Te—Ge, Te—Se—Sb, Te—Ge—Se, or Ag—In—Sb—Te. Especially useful are the compounds described in U.S. Pat. No. 5,876,822 filed by Applicants. These compounds show a short complete erase time (CET) and have a composition defined in atomic percentages by the formula:

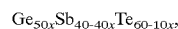

$$Ge_{50x}Sb_{40-40x}Te_{60-10x},$$

wherein $0.166\leq x\leq0.444$. These compounds are situated on the line connecting the compounds GeTe and $Sb_2Te_3$ in the ternary Ge—Sb—Te phase diagram, and include the stoichiometric compounds $Ge_2Sb_2Te_5$ (x=0.445), $GeSb_2Te_4$ (x=0.286) and $GeSb_4Te_7$ (x=0.166).

Other useful compounds are described in U.S. Pat. No. 6,127,049 filed by Applicants. These compounds have a composition defined by an area in the ternary phase diagram Ge—Sb—Te, said area being of pentagonal shape having the following vertices P, Q, R, S and T:

| | |
|---|---|
| $Ge_{14.2}Sb_{25.8}Te_{60.0}$ | (P) |
| $Ge_{12.7}Sb_{27.3}Te_{60.0}$ | (Q) |
| $Ge_{13.4}Sb_{29.2}Te_{57.4}$ | (R) |
| $Ge_{15.1}Sb_{27.8}Te_{57.1}$ | (S) |
| $Ge_{13.2}Sb_{26.4}Te_{60.4}$ | (T); |

With these compounds CET-values below 50 ns can be achieved.

Other useful compounds have a composition:

$$(GeSb_2Te_4)_{1-x}Te_x$$

wherein x satisfies: $0.01 \leq x \leq 0.37$. These compounds are situated on the tie-line connecting $GeSb_2Te_4$ and Te in the ternary phase diagram, but within the pentagonal area PQRST. With these compounds CET-values lower than 45 ns are obtained.

When up to 3.5 at. % oxygen is added to anyone of the above-mentioned Ge—Sb—Te compounds, even lower CET-values are obtained.

The crystallization speed or CET-value of the mentioned Ge—Sb—Te compounds depends on the layer thickness of the recording layer. CET decreases rapidly as the layer thickness increases. When the recording layer is thicker than 25 nm, the CET is essentially independent of its thickness. Above 35 nm the cyclability of the medium is adversely affected. The cyclability of the medium is measured by the relative change of the optical contrast C after a large number of DOW-cycles, e.g $10^5$. In every cycle recrystallizing through heating with a laser-light beam erases the old amorphous marks while the new amorphous marks are written. In the ideal case, the optical contrast C remains unchanged after cycling. The cyclability is practically constant up to a layer thickness of the recording layer of 35 nm. As a result of the combined demands regarding CET and cyclability, the thickness of the recording layer preferably ranges between 5 and 35 nm, more preferably between 10 and 30 nm. A medium having a recording layer with a thickness between 10 and 30 nm has a constant low jitter during the first $10^5$ DOW-cycles.

A reflective layer may be present in the stack, which comprises at least one of the metals selected from a group consisting of Al, Ti, Au, Ag, Cu, Rh, Pt, Pd, Ni, Co, Mn, Cr, Mo, W, Hf and Ta, including alloys thereof. Generally, this reflective layer, if any, is present at a side of the stack opposite to the side of the stack where the laser-light beam enters. The absorptive layer may act as a reflective layer when the laser light beam passes the recording layer first, in which case no reflective metal layer is required. But depending on the kind of optical information medium a reflective metal layer may be required in order to obtain sufficient absolute reflection to meet its specifications.

The first, second and third dielectric layers may consist of a mixture of ZnS and $SiO_2$, e.g. $(ZnS)_{80}(SiO_2)_{20}$. The layers may also consist of $SiO_2$, $TiO_2$, ZnS, $Si_3N_4$, AlN or $Ta_2O_5$. Preferably, a carbide is used, like SiC, WC, TaC, ZrC or TiC. These materials give a higher crystallization speed and a better cyclability than a ZnS—$SiO_2$ mixture.

As already mentioned earlier the second dielectric layer prevents migration, or alloying by diffusion, between the light-absorptive layer and the recording layer. Furthermore its thickness may fine tune the ratio of $A_c$ and $A_a$ due to interference effects. The thickness amounts preferably between 2 and 75 nm, more preferably between 15 and 60 nm. A smaller thickness than 2 nm may cause the formation of cracks, and reduces the cyclability. A larger thickness than 75 nm reduces the cooling rate of the recording layer and reduces the effect of the light-absorptive layer.

The phase-change recording layer may be applied to the substrate by vacuum deposition, such as electron beam evaporation, chemical vapor deposition, ion plating or sputtering. The layer as deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the Ge—Te, Ge—Te—O or Ge—Te—N compound, e.g. 190° C. A synthetic resin substrate, such as polycarbonate, can alternatively be heated by a laser-light beam of sufficient power. This can be realized, e.g. in a recorder, in which case the laser-light beam scans the moving recording layer. The amorphous layer is then locally heated to the temperature required for crystallizing the layer, without the substrate being subjected to a disadvantageous heat load.

The light-absorptive layer may be applied to the substrate by sputtering. A Si, Ge, Ti, Zr, Hf, Nb or Ta sputter target having the desired amount of oxygen or nitrogen can be applied, or use can be made of pure targets of said elements, thereby controlling the amount of oxygen or nitrogen in the sputtering gas. In practice, the concentration of oxygen or nitrogen in the sputtering gas will be typical between almost zero and approximately 30% by volume.

The substrate of the information medium consists, for example, of polycarbonate (PC), polymethyl methacrylate (PMMA), amorphous polyolefin or glass. In a typical example, the substrate is disc-shaped and has a diameter of 120 mm and a thickness of 0.1, 0.6 or 1.2 mm. When a substrate of 0.6 or 1.2 mm is used, the layers can be applied on this substrate starting with the first dielectric layer. If the laser-light enters the stack via the substrate, said substrate must be at least transparent to the laser-light wavelength. The layers of the stack on the substrate may also be applied in the reversed order, i.e. starting with the third dielectric layer, in which case the laser-light beam will not enter the stack through the substrate. Optionally an outermost transparent layer may be present on the stack as a cover layer that protects the underlying layers from the environment. This layer may consist of one of the above mentioned substrate materials or of a transparent resin, for example, an UV light-cured polymethacrylate with, for example, a thickness of 0.1 mm. If the laser-light beam enters the stack via the entrance face of this transparent layer, the substrate may be opaque.

The surface of the substrate of the optical information medium on the side of the recording layer is, preferably, provided with a servotrack that may be scanned optically with the laser-light beam. This servotrack is often constituted by a spiral-shaped groove and is formed in the substrate by means of a mould during injection moulding or pressing. This groove may alternatively be formed in a replication process in a synthetic resin layer, for example, of an UV light-cured layer of acrylate, which is separately provided on the substrate. In high-density recording such a groove has a pitch e.g. of 0.5–0.8 µm and a width of about half the pitch.

BRIEF DESCRIPTION OF THE DRAWINGS

The optical information medium according to the invention will be elucidated in greater detail by means of an exemplary embodiment and with reference to the accompanying drawing, in which FIG. 1 shows a schematic cross-sectional view of an optical information medium with a stack having an MIPIAI structure.

DETAILED DESCRIPTION OF THE INVENTION

Embodiment

In FIG. 1 the optical information medium (20) for erasable recording by means of a laser-light beam (10) has a substrate (1) and a stack (2) of layers provided thereon. The stack (2) has a recording layer (5) that is able to change between an amorphous and a crystalline state. The recording layer (5) is interposed between a first dielectric layer (4) and a second dielectric layer (6).

The first and second dielectric layer (4, 6) are made of $(ZnS)_{80}(SiO_2)_{20}$ and have a thickness of 20 nm and 49 nm respectively.

A light-absorptive layer (7) is present proximate the recording layer (5) and has a thickness of 20 nm. The light-absorptive layer (7) comprises a compound of the formula $SiO_{0.7}$. It is achieved that $A_c/A_a=0.85$ at a laser-light wavelength of 405 nm. Without the presence of this light-absorptive layer (7) $A_c/A_a=0.71$, leading to considerably more recording mark distortion.

A third dielectric layer (8) is present proximate the light-absorptive layer (7) at a side remote from the recording layer (5). The thickness of the third dielectric layer (8) is 55 nm. The recording layer (5) is of GeTe.

A reflective layer (3) of Al is present in the stack and has a thickness of 100 nm. In such a stack, at a laser-light wavelength of 405 nm, the amorphous reflection $R_a=4\%$ and the crystalline reflection is $R_c=14\%$.

Substrate 1 is a polycarbonate disc-shaped substrate having a diameter of 120 mm and a thickness of 0.6 mm.

An optional cover layer (9), made of UV cured resin Daicure SD 415 with a thickness of 100 $\mu m$ is present adjacent the third dielectric layer.

According to the invention, an optical information medium for high-density erasable recording is provided, such as DVR-blue, with a light-absorptive layer proximate a recording layer of a phase change material. The laser-light absorption of the light-absorptive layer is easily tunable by varying its O or N content during manufacture. This in order to achieve that $0.8<A_c/A_a<1.50$, in which $A_c$ and $A_a$ are the respective quantities of laser-light absorbed in the recording layer in the crystalline state and the amorphous state at a laser-light wavelength selected from a range of 350–450 nm. Thus, high data rates and high recording speeds are achieved at said wavelength range.

What is claimed is:

1. An optical information medium for erasable recording by means of a laser-light beam having a laser-light wavelength, said medium having a substrate and a stack of layers provided thereon, the stack comprising:

a recording layer that is able to change between an amorphous and a crystalline state, said recording layer being interposed between a first dielectric layer and a second dielectric layer, wherein a complete erasure time (CET) is less than 45 ns, and wherein CET is defined as the minimum duration of an erasing pulse of the laser light beam for complete crystallization of a written amorphous mark in a crystalline environment of the recording layer;

a light-absorptive layer, wherein the light-absorptive layer comprises a compound of the formula $QR_x$, in which Q is an element selected from the group consisting of Si, Ge, Ti, Zr, Hf, Nb and Ta, R is an element selected from the group consisting of O and N, and $0<x<2.5$; and a third dielectric layer, wherein the light-absorptive layer is interposed between the second dielectric layer and the third dielectric layer, wherein the recording layer is in direct mechanical contact with the first dielectric layer and with the second dielectric layer, and wherein the light-absorptive layer is in direct mechanical contact with the second dielectric layer and with the third dielectric layer.

2. The optical information medium of claim 1, wherein Q is an element selected from the group consisting of Si and Ge.

3. The optical information medium of claim 1, wherein R is the element O.

4. The optical information medium of claim 1, wherein the laser-light wavelength is selected from the range of 375–425 nm.

5. The optical information medium of claim 1, wherein the thickness of the third dielectric layer is between 2 and 200 nm.

6. An optical information medium of claim 1, wherein the recording layer comprises a compound of Ge and Te.

7. The optical information medium of claim 1, wherein the recording layer comprises a compound of Ge, Sb and Te.

8. The optical information medium of claim 1, wherein a reflective layer is present in the stack, the reflective layer comprising at least one of the metals selected from a group consisting of Al, Ti, Au, Ag, Cu, Rh, Pt, Pd, Ni, Co, Mn, Cr, Mo, W, Hf and Ta, including alloys thereof.

9. The optical information medium of claim 1, wherein the relative linear velocity between the laser-light beam and the medium is at least 7.2 m/s.

10. The optical information medium of claim 1, wherein a cover layer is present in the stack, wherein the cover layer is in contact with the third dielectric layer, and wherein the cover layer comprises a transparent resin.

11. An optical information medium for erasable recording by means of a laser-light beam having a laser-light wavelength, said medium having a substrate and a stack of layers provided thereon, the stack comprising:

a recording layer that is able to change between an amorphous and a crystalline state, said recording layer being interposed between a first dielectric layer and a second dielectric layer, wherein a complete erasure time (CET) is less than 45 ns, and wherein GET is defined as the minimum duration of an erasing pulse of the laser light beam for complete crystallization of a written amorphous mark in a crystalline environment of the recording layer; and a light-absorptive layer proximate a side of the recording layer away from the first dielectric layer, wherein the light-absorptive layer comprises a compound of the formula $QR_x$, in which Q is an element selected from the group consisting of Si, Ge, Ti, Zr, Hf, Nb and Ta, R is an element selected from the group consisting of O and N, and $0<x<2.5$, and wherein the light-absorptive layer is characterized such that it has a thickness of 75 nm or less to facilitate that marks written in a crystalline area within the recording layer have substantially the same size as marks overwritten in an amorphous area of the recording layer.

12. The optical information medium of claim 1, wherein the thickness of the recording layer is between 5 and 35 nm.

13. The optical information medium of claim 1, wherein the thickness of the recording layer is between 10 and 30 nm.

14. The optical information medium of claim 1, wherein the thickness of the light-absorptive layer is between 2 and 75 nm.

15. The optical information medium of claim 1, wherein the thickness of the light-absorptive layer is between 15 and 60 nm.

16. The optical information medium of claim 1, wherein a surface of the substrate on the side of the recording layer is has a servotrack that may be scanned optically with the laser-light beam.

17. The optical information medium of claim 16, wherein the servotrack comprises a spiral-shaped groove.

18. The optical information medium of claim 17, wherein the spiral-shaped groove has a pitch between 0.5 and 0.8 $\mu$m.

19. The optical information medium of claim 4, wherein the relative linear velocity between the laser-light beam and the medium is at least 7.2 m/s.

20. The optical information medium of claim 1, wherein the recording layer comprises $Ge_{50x}Sb_{40-40x}TE_{60-10x}$, and wherein $0.166 < x < 0.444$.

21. The optical information medium of claim 1, wherein the recording layer comprises $(GeSb_2Te_4)_{1-x}TE_x$, wherein $0.01 < x < 0.37$.

22. The optical information medium of claim 1, wherein the recording layer comprises a composition defined by an area in the ternary phase diagram Ge—Sb—Te, said area being of pentagonal shape having the following vertices P, Q, R, S and T:

$Ge_{14.2}Sb_{25.8}Te_{60.0}(P)$;

$Ge_{12.7}Sb_{27.3}Te_{60.0}(Q)$;

$Ge_{13.4}Sb_{29.2}Te_{57.4}(R)$;

$Ge_{15.1}Sb_{27.8}Te_{57.1}(S)$; and $Ge_{13.2}Sb_{26.4}Te_{60.4}(T)$.

23. The optical information medium of claim 1, wherein the CET is less than 35 ns.

24. The optical information medium of claim 1, wherein the light-absorptive layer has a composition such that $0.8 < A_c/A_a < 1.50$, in which $A_c$ and $A_a$ are the respective quantities of laser-light absorbed in the recording layer in the crystalline state and the amorphous state at a laser-light wavelength selected from a range of 350–450 nm.

25. The optical information medium of claim 1, wherein the light-absorptive layer has a composition such that $0.8 < A_c/A_a < 1.50$, in which $A_c$ and $A_a$ are the respective quantities of laser-light absorbed in the recording layer in the crystalline state and the amorphous state at a laser-light wavelength $\lambda$ selected from 350 nm$\lambda$<380 nm or from 420 nm<$\lambda$<450 nm.

* * * * *